ELECTRICAL SIGNAL STORAGE

Filed Sept. 4, 1951 2 Sheets-Sheet 1

INVENTORS
FRANK D. COVELY &
RICHARD E. BAKER
BY J. L. Whittaker
ATTORNEY

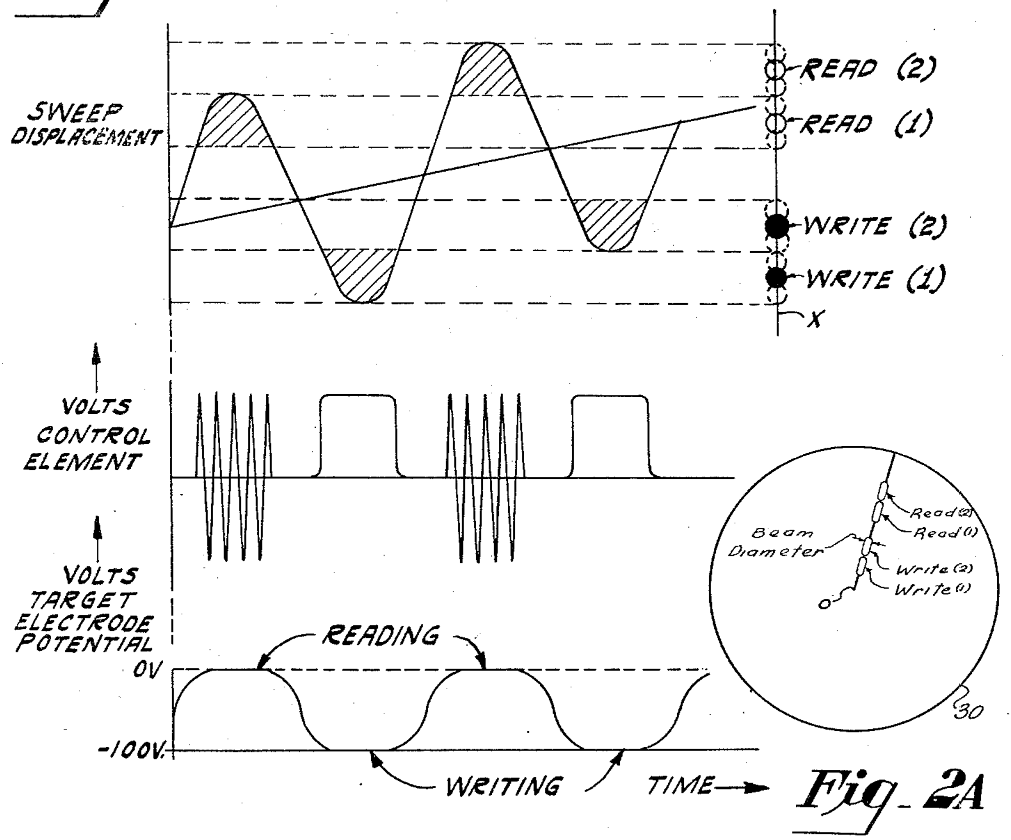
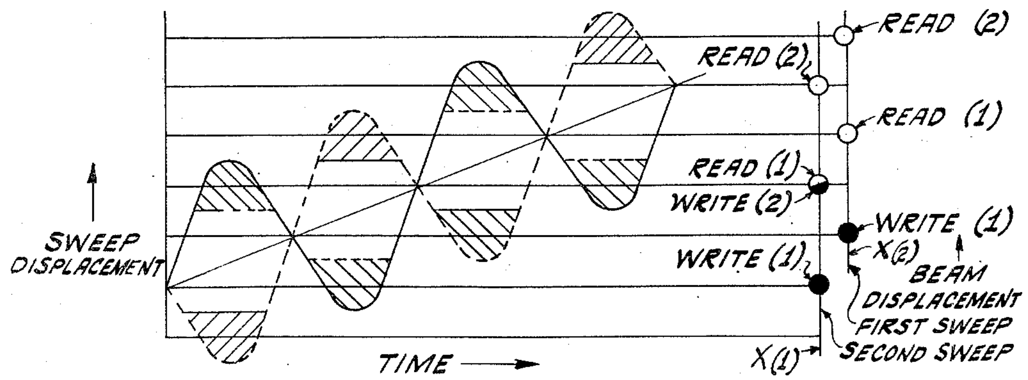
INVENTORS
FRANK D. COVELY &
RICHARD E. BAKER
BY J. L. Whittaker
ATTORNEY 2,802,967
Patented Aug. 13, 1957

2,802,967

ELECTRICAL SIGNAL STORAGE

Frank D. Covely, Collingswood, N. J., and Richard E. Baker, Indianapolis, Ind., assignors to Radio Corporation of America, a corporation of Delaware Application September 4, 1951, Serial No. 244,912

11 Claims. (Cl. 315—22)

The present invention is related to the storage of electrical signals, and more particularly to the storage of such signals in storage tubes.

It is known to store signals in a storage tube, read the stored signals, and store them again at substantially the same points as that from which the signals were read. New signals may be added to the stored ones as desired. This type of system is of value in certain radar (radio echo detection and ranging) systems where an effective integration of signals may be achieved together with a consequent improvement of signal-to-noise ratio as a result of the integration. These systems and those of the present invention may also find utility in sonar (sound echo detection and ranging) or radar systems where long storage times are required. For example, the highest persistence cathode ray tubes used in a PPI (plan position indication) type of system, may be insufficient to allow display of the entire region being surveyed by the radar or sonar set at the desired rate of scan of the region.

The copending application of Frank D. Covely and Richard E. Baker, entitled "Electrical Signal Storage," Serial No. 236,442, filed July 12, 1951, discloses an improvement upon the storage systems of the type disclosed above, which allows the use of a single two-gun storage tube. In the said copending application, a system is described in which, briefly, the reading beam of a two-gun storage tube is maintained in advance of the writing beam. The signals read are circulated through a circulating signal loop and reapplied to the writing beam. The lag of the writing beam is such that the signals are rewritten on the same points from which they were originally read.

It is an object of the present invention to provide another improved storage system of the type in which signals are circulated and stored again at points corresponding to those from which they were read on a storage tube target.

It is another object of the invention to improve the registration of the storage points of the signals circulated and stored again with the corresponding points from which they were read from a storage tube target.

Another object of the invention is to provide a system of the type described in which only a single single-gun storage tube is required, rather than those in which a multiple-gun tube or in which multiple tubes are required.

In accordance with the invention, a storage tube is employed having a single electron beam gun. The electron beam deflection is modulated to cause the beam alternately to advance in equal steps and retreat in equal steps across the target in the direction of its sweep, each advance being greater than each retreat. Thus the beam moves across the target by steps both forward and backward, the former being greater than the latter. The target or other reading electrode is coupled to a loop circuit which re-applies the signal read to the writing control electrode of the electron beam gun after a certain delay time. The electrodes are modulated so that at each forward step of the beam across the target a stored signal is read; at each backward step a signal from the loop circuit is written. But the forward and backward steps are correlated with the delay time so that the signal read at one forward step is rewritten on the target, or stored again, when the beam next reaches this point on a backward step. With this system of the invention, more exact registration of the restorage of signals with the points on the targets from which these same signals were read over prior methods is achieved. The employment of a single-gun tube makes more precise registration easier to achieve, whereas registration is a difficult problem when two or more electron beams are employed, one to rewrite or restore the signal read by the other beam.

A further feature of the invention resides in a novel inter-lace scanning scheme, which tends to avoid signal creep. In accordance with this further feature, the forward and backward steps read and write respectively at intervals of about two beam widths or element sizes, on one target scan. Thus, the stored signal is circulated only for alternate elements. Signals from the other alternate elements are read, circulated, and restored only on the next frame of the target scan.

The foregoing objects, and other objects, advantages, and novel features of the invention will be more apparent from the following description when taken in connection with the accompanying drawing in which:

Fig. 2 is a set of graphs explaining motion of the beam across a strobe line of the storage target face and useful in understanding the operation of the embodiment of Fig. 1;

Fig. 2A is a view of the storage target face showing the strobe line shown separately in Fig. 1 and motion of the beam on the line, although grossly out of scale; and Fig. 3 is a graph useful in understanding the operation of the invention with the inter-laced scanning mentioned hereinbefore.

Figure 1:
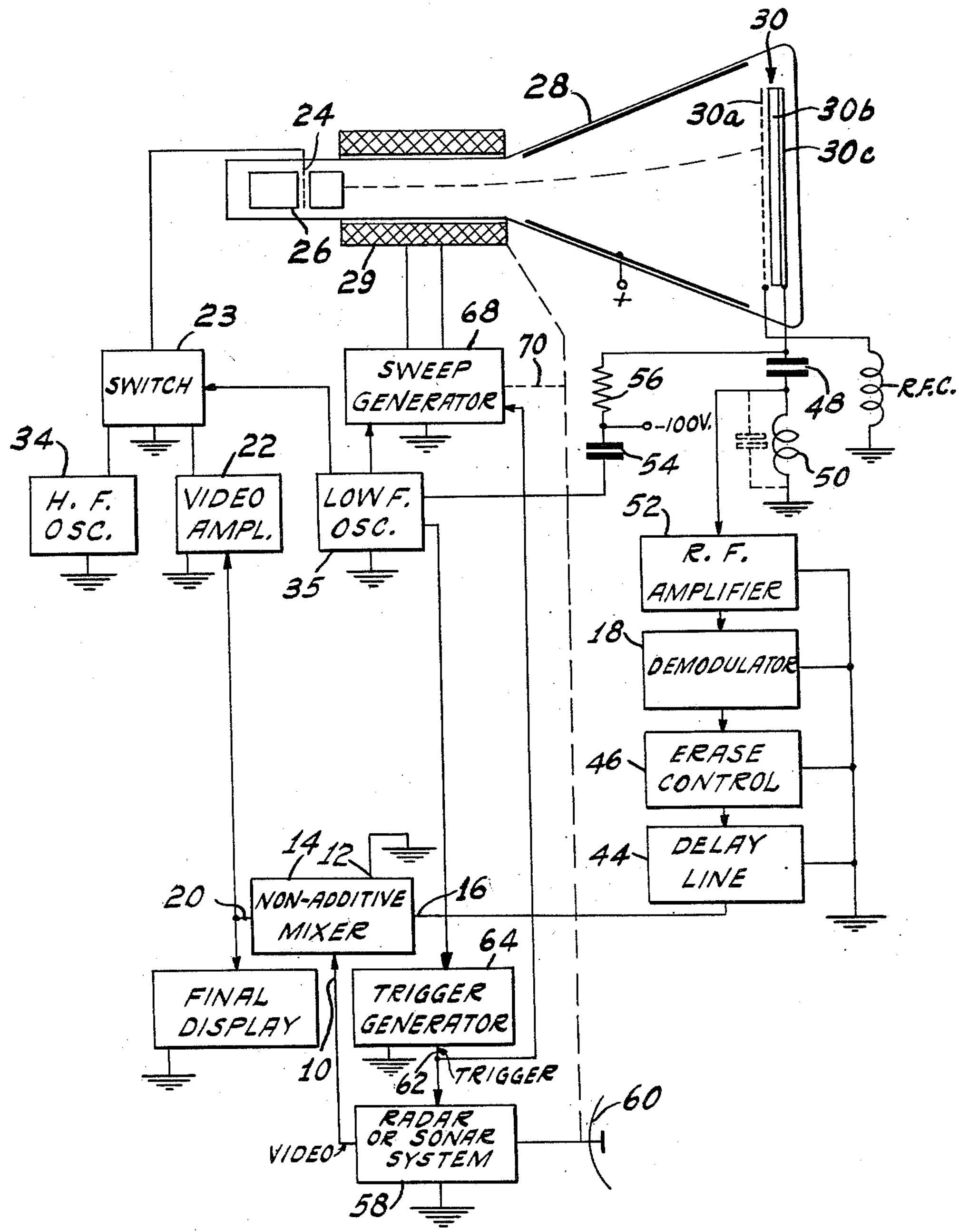
Fig. 1 is a schematic diagram, largely in block form, illustrating one embodiment of the invention.

Referring to Fig. 1, the signals to be stored may be applied between the terminals 10, 12 of a mixing circuit 14 which is to mix incoming signals with those just read, if any. Preferably, for reasons set out hereinafter, a non-additive mixing circuit is employed. A discussion of such non-additive mixing circuits and their employment may be found in Vacuum Tube Amplifiers, edited by Valley and Wallman, volume 13 of the Radiation Laboratory Series, starting near the bottom of page 100. Another improved form of such a non-additive mixing circuit which may be employed is disclosed in U. S. Patent No. 2,695,953, issued November 30, 1954, to Edwin M. Seabury. The terminal 12 may be connected to a common conductor, conventionally indicated as ground.

The circulating signal is also applied to the non-additive video mixer 14 at a terminal 16 from a delay line 44 supplied by an erase control circuit 46 with signals from a demodulator 18. The output of the video mixer 14 is applied by connection 20 to a video amplifier 22. A control element 24 of a writing electron gun 26 of a storage tube 28 receives the output of the video amplifier 22 after passage of the signal therefrom through a switch 23. Magnetic deflection coils 29 as illustrated (or well-known electrostatic deflection plates) provide deflection means for the electron beam generated in the gun 26. The gun 26 is schematically shown without any power supplies being illustrated, such power supplies being known. The storage tube 28 may be of the type sometimes called a barrier-grid storage tube or a Radechon. Such a tube is described in detail in the RCA Review, volume X, No. 1, pp. 112 through 135 (March 1948).

A target 30 of the storage tube receives the electron beam modulated by the signals from the video amplifier 22 and stores an electrical charge corresponding to the signal at each point as the beam is swept across the target 30. The target 30 includes a grid 30*a* arranged in front of and closely spaced from a mica plate 30*b* and an electrode 30*c* deposited on the side of the plate opposite the grid. A high frequency oscillator 34 having a sine wave output with a frequency of the order of 30 mc./s. (megacycles per second) is also applied through the switch 23 to the control element 24 of the storage tube 28. A low frequency oscillator 35 (having an output signal the frequency of which may be of the order of 250 to 500 kc., dependent upon the radar pulse repetition rate and the resolution required) is connected to the switch 23, which switch of course may be a suitable circuit. The switch 23 responds to the low frequency oscillator 35 so that the output of the high frequency oscillator 34 and the video amplifier 22 are alternately applied through the switch to the control element 24 at the frequency of the low frequency oscillator 35.

The grid 30*a* is connected to ground through a ratio frequency choke, R. F. C. The signal electrode 30*c* is connected through a capacitor 48 and an inductor 50 to ground. The inductor 50 is tuned as by its own shunt capacity to be parallel resonant at 30 mc./s. The tuned circuit of the inductor and its capacity is connected at the junction of the inductor 50 and the capacitor 48 to an R. F. (radio frequency) amplifier 52, the output of which supplies signals to the demodulator 18. The low frequency oscillator 35 applies voltage through a blocking capacitor 54 and a resistor 56 to the electrode 30*c*.

The circuit illustrated may be used in connection with a radio echo detection and ranging system 58 from which pulses of radio frequency energy are emitted from a radiator or receptor 60 and echoes received at radiator or receptor 60 are demodulated and applied as the video signals appearing at the terminal 10 of the video mixer 14. The echo detection and ranging system may be either a radar or a sonar system, the radiator or receptor being respectively either an antenna or a shunt radiator or receptor, as known.

A trigger signal on connection 62 is synchronized at a suitable submultiple of the low frequency oscillator 35 by a trigger generator circuit 64. It is contemplated that the returned signals may be stored and ultimately displayed in the form of a plan position indicator display on a final display device 66.

In operation, the radar system 58 emits a pulse of radio frequency energy at the antenna 60. At the same time the sweep generator 68 receives a trigger signal and applies a sweep voltage to the deflection coils 29 to deflect the electron beam from the gun 26. The electron beam is thereby deflected, for example, initiating one sweep with each trigger from the center of the target 30 radially outward at a constant rate. Any echoes received in the interval before the next trigger pulse, are detected by the radar system 58 and applied to the terminal 10 of mixer 14. If no previous signals have been stored or are circulating, a signal from the terminal 10 is applied to the video amplifier 22 and thence through the switch 23 to moduate the writing beam by means of the control element 24. Preferably the frequency of low frequency oscillator 35 is of such a duration with respect to the duration of a pulse emitted by the radar system 58 (or of an echo), that the switch 23 is in condition to apply the video amplifier 22 output to control element 24 at least partially, for any single echo. Accordingly, a charge is stored on the target 30 at a point radially distant from the center at which the sweep is initiated by an amount proportional to the range of the echoing object from the radar system 58.

The antenna 60 is presumed in this instance to be of the type which is mechanically rotated azimuthally whereby the azimuth of echoing objects may be determined upon receipt of any echo. The deflection coils 29 are connected to rotate at the same angle from some fiducial position as the azimuthal angle of the antenna 60. Accordingly, the deflection coils 29 cause the radial deflection of the electron beam to be at the same angle from some predetermined radial line on the target 30 as the azimuthal angle of the antenna 60. Other means are known for controlling the sweeps of the two beams coordinated with the angle of the radiated energy from which the echo is received. These means may be different from the simple mechanical arrangement indicated here. Other types of display may also be employed.

As the electron beam advances across the strobe (radial line), it is alternately advanced and retarded at the frequency of the low frequency oscillator 35. The alternate advance and retardation may be effected by superimposing the low frequency oscillation from oscillator 35 onto the signal applied from sweep generator 68 to the deflection coils 29. This is indicated by the connection between the low frequency oscillator 35 and the sweep generator 68. The deflection superimposed upon the linear sweep need not be very great and in fact is preferably of the order of 3 to 5 beam width at the target 30. In each advance of the electron beam across the strobe, the low frequency oscillator 35 causes the switch 23 to apply the output of the high frequency oscillator 34 to the control element 24. At the same time a signal is applied through the blocking capacitor 54 and the resistor 56 to the electrode 30*c* to cause any stored charge upon the target to be read. Any stored signal is picked up or read at the electrode 30*c* as a modulated 30 mc./s. signal because of the modulation superimposed by the high frequency modulator 34, the output of which is then being applied to the control element 24.

Such a signal being read at the electrode 30*c* is impressed across the tuned circuit of the inductor 50 and applied to the R. F. amplifier 52. There may be appreciable capacitive coupling between the electrode 30*c* and the grid 30*a*. However, such coupling does not shunt the signal to ground because of the R. F. C. which presents an appreciable impedance between the grid 30*a* and ground. The resistor 56 is inserted for the same reason, that is, to prevent any short-circuiting of the 30 mc./s. modulated signal to ground through the low frequency oscillator 35. The capacitor 48 on the other hand has a very small capacity which presents an appreciable impedance to the low frequency signal from low frequency oscillator 35 but freely passes the 30 mc./s. signal. The arrangement, in other words, is such as to allow the application of suitable bias to the electrode 30*c*, and also permitting the application of the low frequency signal and exclusive reading by means of the high frequency signal. In each advance of the electron beam across the strobe, the low frequency oscillator 35 causes the switch 23 to apply the output of the high frequency oscillator 34 to the control element 24. At the same time a signal is applied through the blocking capacitor 54 and the resistor 56 to the electrode 30*c* to cause any stored charge upon the target to be read. Any stored signal is picked up or read as a modulated 30 mc./s. signal because of the modulation superimposed by the high frequency modulator 34, the output of which is then being applied to the control element 24.

The 30 mc./s. modulated signal which has been applied to the R. F. amplifier 52 is demodulated in demodulator 18, passed through the erase control 46 and thence delay line 44 to return to the non-additive mixer 14.

If no new signals are applied, the signals pass to the video amplifier 22 and are rewritten. At each backward step or retardation of the electron beam along the strobe line, the switch 23 applies the output of video amplifier 22 to control element 24. Also at these times the low frequency oscillator 35 is placing the electrode 30*c* at a potential to receive the signal being written.

The delay time between the reading of the signal picked up from electrode 30*c* and its passage around the loop comprising the R. F. amplifier 52, demodulator 18, erase control 46, delay line 44, mixer 14, video amplifier 22 and back to the control element 24 of the storage tube 28 should be equal as nearly as possible to the time required for the electron beam to travel from one reading point on a forward step until it next reaches the same point on a backward step. It is then apparent that any stored signals will be rewritten on the target at substantially the same points from which they were read.

The operation of the system of Fig. 1 may be more readily understood by reference to Fig. 2 in which there is shown along the same time base idealized graphs illustrating the sweep displacement, the potential of control element 24, and the potential of target electrode 30c. The sweep displacement may be considered first to have advanced a step at the greatest advance of which any stored signal is read as indicated by the legend "Read (1)." During this interval of time, the control element 24 has applied to it a 30 mc./s. signal which is indicated conventionally as a high frequency signal. The target electrode potential has been brought approximately to zero volts so that the target is placed or actuated in condition to be read. A half period of the oscillations of low frequency oscillator 35 later, the sweep displacement has stepped the beam backwards as indicated by the legend "Write (1)." During this time one may presume a signal upon control element 24 from the video amplifier 22 as indicated by the positive-going pulse in the graph, which signal is therefore being stored. At the same time, the target electrode potential has been brought to −100 volts, the condition to which it was biased. A half period still later (at the low frequency oscillation rate) the electron beam has stepped along the strobe stepping forward a greater distance than it stepped backwards. In this position, the switch again applies to the control element, the high frequency 30 mc./s. signal and the target electrode potential is again in the read condition. The alternate advancement and retardation of the electron beam is indicated on the line X of Fig. 2 which may be taken as the strobe line, the circles indicating the dimensions of the electron beam at the point at which it strikes the target. The electric wave or signal on the target electrode may be shaped as shown before application to the target electrode.

The operation described in the preceding paragraph is also illustrated in Fig. 2A. The strobe line is indicated on the target 30 in face view. The reading and writing areas and the sequence thereof are illustrated on the strobe line X, but it will be understood that the areas are grossly exaggerated in order to be easily understood. In its travel along the strobe line X outward, let it be supposed that the beam is found in the portion of the area indicated read (1) at the point nearest the center O of the target 30. As the beam moves outwardly along the strobe line X to the outermost limit to the read (1) area and return, the target is in a reading condition and the signal is read from the target. Next the beam sweeps quickly toward the center O until it reaches the outermost portion of the area indicated write (1) at which time the storage tube is in a writing condition and signals are written on the target along the strobe line X as the beam sweeps from the outer portion of the write (1) area to the portion nearest the center O and out again. Next the beam is swept quickly to the read (2) area and reading is commenced as the beam reaches the innermost portion of the area indicated as read (2). The beam reads as it sweeps outwardly to the extreme radial position of the read (2) area and back again to the radially innermost portion. Then the beam is displaced quickly to the write (2) area, etc. The manner in which the reading and writing takes place with a single beam is fully apparent from a consideration of Figs. 2 and 2A.

In Fig. 3 a scheme of interlace scanning is schematically illustrated. According to this scheme, the spaces between the points to which the beam is stepped on one scan are utilized on the next scan. This enables the scanning rate to acquire the information for a complete PPI picture to be cut in half. In other words, the scan during one frame reads and writes on the elements which were omitted on the previous frame. To accomplish this, it is only necessary to synchronize the sweep generator with the trigger and the low frequency oscillator so that throughout one scan, the beam starts from its initial central position on the radial sweep with a step forward whereas on the next scan it starts with a step backwards. This may be accomplished by a mechanical connection 70 from the deflection coils 29 which reverses either electronically or mechanically the phase of the application of the frequency oscillator 35 output to the sweep generator 68 every time the deflection coils 29 complete a revolution.

In this system of the invention the problem of registration of the reading and writing information, that is, registration of the signals read to be rewritten upon the same points from which read is greatly improved over prior systems, because a single electron beam is used for both functions and it will tend to remain upon the same strobe line as it is stepped back and forth. It may be desirable to prevent reading or writing, or both, at or near one, or both, of the end points of each strobe or sweep line by suitable means known to the art, to prevent these end points from writing or reading spurious signals. Such means are not illustrated. The steps should be sufficiently large to prevent rewriting information on the target at the points from which it is being read. If it is desired to erase old information on the target, the erase control 46 may be employed. This control interrupts the signal for a suitable period of time. The erasure can be applied to all the old information or in a selected gate fashion to portions of the PPI stored signals.

What is claimed is:

1. In a signal storage system, the combination comprising a storage tube having an electron beam gun and a storage target toward which said beam is directed, said target including signal responsive means for actuating said target in one of a signal storing condition and signal reading condition, and means comprising an oscillator to deflect said beam across said target in alternate forward and backward steps taken at the oscillator frequency, the forward steps being greater than the backward steps, said oscillator being also connected to said signal responsive means to actuate said target in response to the oscillator signals in a reading condition on each forward step and a storing condition on each backward step.

2. The combination claimed in claim 1, said electron gun comprising a control element to control the beam intensity in response to a signal applied thereto, a second oscillator of a higher frequency of oscillations than said first oscillator, means to make connection to a source of signals to be stored, and a switch connected to and under control of said oscillator and also connected to said high frequency oscillator and to said signal connection means to apply signals from said high frequency oscillator and from signal connection means alternately to said control element, said high frequency oscillator signal being applied to said control element at each beam forward step, and signals from said connecting means being applied to said control element at each beam backward step.

3. The combination claimed in claim 2, further comprising a circulating signal circuit connected to said storage target to read signals therefrom in said reading condition and connected to the said signal connection means as a source of the read signals, thereby completing a loop circuit, the time delay of signals from the reading thereof around the loop circuit to application to said control element being equal to the time for said beam after reaching a point an a forward step to next reach the same point on a backward step, whereby the signals read from one point are circulated and stored again at substantially the same point on the said target.

4. The combination claimed in claim 3, said reading means comprising a tuned circuit connected to said target and responsive only to modulated signals of said high frequency oscillator, and a demodulator connected to said tuned circuit to demodulate said high frequency modulated signals.

5. The combination claimed in claim 4, said demodulator being connected to said signal connection means through a mixer circuit including means to receive signals from a source external to the storage system, whereby external signals may be added to those circulating in the said system.

6. The combination claimed in claim 3, further comprising an erase control connected between said target electrode and said control element to interrupt the application of signals.

7. In a signal storage system the combination comprising a storage tube having an electron beam gun, a storage target toward which the electron beam from said gun is directed, and a signal receiving electrode, means to deflect said beam across said target, an oscillator having a first frequency of oscillation, a sweep generator connected to said deflecting means to control the beam deflection in a sweep line across said target, a trigger generator circuit connected to said low frequency oscillator to produce a trigger signal at a submultiple of said first frequency, said sweep generator being connected to said trigger generator to have the sweep frequency controlled at the said trigger frequency and connected to said oscillator to have superimposed on the said sweep deflection the higher first frequency, thereby advancing the beam in forward and backward steps across said line on the target, said target including an electrode, and means including said electrode and connected to said oscillator to cause said signals to be stored on said target at each backward step of said beam to cause said signals to be read at each forward step of said beam.

8. In a signal storage system the combination comprising a storage tube having an electron beam gun, a control element to control the beam intensity, a storage target toward which said beam is directed, said target comprising a dielectric storage plate, a grid closely spaced from said plate between said plate and said gun, and an electrode on the side of said plate away from said gun, an oscillator of a first frequency of oscillation, a trigger circuit connected to said oscillator to produce a trigger voltage at a submultiple of said first frequency, a sweep generator connected to said trigger circuit and to said oscillator to generate a beam deflection electric wave of the trigger frequency and with the first frequency superimposed thereon, a deflection means connected to said sweep generator to deflect said beam in response to said beam deflection wave, whereby the beam is deflected to advance in steps forward and backward across a line on said target, the forward steps being greater than the backward steps, a high frequency oscillator of a second frequency higher than said first frequency, means to receive signals from a source of signals, a switch connected to said control element, to said second oscillator, to said signal receiving means, and to said first oscillator, to apply to said element alternately at said first frequency the output of said second oscillator at said second frequency and signals from said source from said signal receiving means, said target electrode being connected to said first oscillator to be at a higher reading or a lower writing potential respectively during the beam forward and backward steps while said switch respectively applies said second frequency and said signal to said control element, and a filter circuit connected to said target electrode to receive second frequency modulated signals and reject those of other frequencies.

9. The system claimed in claim 8, further comprising a demodulator connected to said filter circuit to demodulate said modulated high frequency signals, a mixer to receive said demodulated signals, said signal applying means being connected to pass signals received from said mixer, the time delay of the circuit from said target electrode through said filter, demodulator mixer and signal applying means being equal substantially to the time required for the said beam to next advance from one point at a forward step to the same point on a backward step.

10. The combination claimed in claim 1, further comprising means connected to the sweep generator to cause alternate sweeps to start with a forward step and the other alternate sweeps to start with a backward step, thereby to interlace the forward and backward steps to fall at different points on said target on alternate sweeps along the same line.

11. A signal storage system comprising, an electrical storage tube having means for producing an electron beam, a beam control electrode, and a storage electrode toward which said beam is directed, means for applying electrical signals to said control electrode for modulating said electron beam to store said signals on said storage electrode, means including an oscillator for deflecting said electron beam across said storage electrode in alternate forward and backward steps at the frequency of said oscillator, means for withdrawing from said tube on each forward step of said beam signals stored on said storage electrode, and means for re-storing said withdrawn signals on each backward step of said beam at the same point on said storage electrode from which said signals were withdrawn.

References Cited in the file of this patent

UNITED STATES PATENTS

| | | |
|---|---|---|
| 2,059,004 | Leeds | Oct. 27, 1936 |
| 2,093,157 | Nakashima et al. | Sept. 14, 1937 |
| 2,276,359 | Von Ardenne | Mar. 17, 1942 |
| 2,617,963 | Arditi | Nov. 11, 1952 |
| 2,642,550 | Williams | June 16, 1953 |
| 2,671,607 | Williams | Mar. 9, 1954 |